(12) United States Patent
Roe (10) Patent No.: US 8,394,353 B2
(45) Date of Patent: Mar. 12, 2013

(54) CATALYST CONTAINMENT UNIT (75) Inventor: Stephen Philip Roe, Royston (GB)

(73) Assignee: Johnson Matthey PLC, London (GB)

( * ) Notice: Subject to any disclaimer, the term of this patent is extended or adjusted under 35 U.S.C. 154(b) by 63 days.

(21) Appl. No.: 13/124,968

(22) PCT Filed: Sep. 17, 2009

(86) PCT No.: PCT/GB2009/051205
§ 371 (c)(1),
(2), (4) Date: Apr. 19, 2011

(87) PCT Pub. No.: WO2010/046675
PCT Pub. Date: Apr. 29, 2010

(65) Prior Publication Data
US 2011/0200515 A1 Aug. 18, 2011

(30) Foreign Application Priority Data

Oct. 20, 2008 (GB) .................................. 0819094.4

(51) Int. Cl.
*B01J 8/00* (2006.01)
*B01J 8/02* (2006.01)
*B01J 35/02* (2006.01)
*B23P 17/04* (2006.01)
*B23P 23/00* (2006.01)
*C01B 21/26* (2006.01)

(52) U.S. Cl. ........ 423/403; 422/211; 422/187; 422/600; 29/401.1

(58) Field of Classification Search .................. 423/403; 29/401.1; 422/211, 600, 187
See application file for complete search history.

(56) References Cited

U.S. PATENT DOCUMENTS 1,682,787 A * 9/1928 Jaeger ........................... 422/637
3,620,685 A * 11/1971 Rogers et al. .................. 422/637
3,817,716 A 6/1974 Betz
(Continued)

FOREIGN PATENT DOCUMENTS
CA 2329871 11/1999
DE 2226697 1/1973
(Continued)

OTHER PUBLICATIONS

Holland, et al., "A Unique Computer Centered Instrument for Simultaneous Absorbance and Fluorescence Measurements," Analytical Chemistry, vol. 45, No. 1, Jan. 1973, pp. 145-153.
(Continued)

*Primary Examiner* — Timothy Vanoy
(74) *Attorney, Agent, or Firm* — RatnerPrestia (57) ABSTRACT

A catalyst containment unit, includes two concentric perforate members defining an annular space in which a particulate catalyst may be placed, and process fluid-impermeable end members mounted on the ends of the perforate members, wherein one end member extends across the unit to provide a closed end and the other end member closes the annular space thereby providing an open end through which gases may enter or exit the unit, and suspending means attached to one or both end members for securing the unit within an ammonia oxidation vessel. The unit may be suspended, for example, below a precious metal ammonia oxidation gauze pack and may contain a particulate ammonia oxidation catalyst or nitrous oxide abatement catalyst. A catalyst combination includes a precious metal ammonia oxidation catalyst gauze on a supporting framework and a particulate catalyst disposed in a catalyst containment unit.

21 Claims, 3 Drawing Sheets

U.S. PATENT DOCUMENTS

| | | | |
|---|---|---|---|
| 3,948,610 A | | 4/1976 | Sutcliffe |
| 4,033,727 A | * | 7/1977 | Vautrain ..................... 422/218 |
| 4,040,794 A | * | 8/1977 | Stone ............................ 422/638 |
| 5,478,549 A | | 12/1995 | Koch |
| 6,127,133 A | | 10/2000 | Akong |
| 6,534,029 B1 | | 3/2003 | Klein |
| 2004/0179986 A1 | | 9/2004 | Burckhardt |
| 2006/0269461 A1 | | 11/2006 | Scanlon |
| 2007/0064323 A1 | | 3/2007 | Luther |
| 2007/0098613 A1 | | 5/2007 | Wessel |
| 2008/0274463 A1 | | 11/2008 | Chen |

FOREIGN PATENT DOCUMENTS

| | | |
|---|---|---|
| EP | 0364153 | 4/1990 |
| EP | 0931585 | 7/1999 |
| EP | 0946290 | 10/1999 |
| GB | 2064975 | 6/1981 |
| GB | 2096484 | 10/1982 |
| WO | 9907638 | 2/1999 |
| WO | 9925650 | 5/1999 |
| WO | 9964352 | 12/1999 |
| WO | 0013789 | 3/2000 |
| WO | 0202230 | 1/2002 |
| WO | 2005052560 | 6/2005 |

OTHER PUBLICATIONS

International Search Report from Application No. PCT/GB2009/051205, dated Feb. 3, 2010.

Kapteijn et al., "Heterogeneous Catalytic Decomposition of Nitrous Oxide," Applied Catalysis B: Environmental 9 (1996) pp. 25-64.

Thiemann, M. et al., "Nitric Acid, Nitrous Acid, and Nitrogen Oxides," pp. 1-49, "Ullmann's Encyclopedia of Industrial Chemistry (electronic version)", Eds. Bohnet, M. et al., Jun. 15, 2000.

* cited by examiner

CATALYST CONTAINMENT UNIT

CROSS-REFERENCE TO RELATED APPLICATIONS

This application is the U.S. National Phase application of PCT International Application No. PCT/GB2009/051205, filed Sep. 17, 2009, and claims priority of British Patent Application No. 0819094.4, filed Oct. 20, 2008.

FIELD OF THE INVENTION

This invention relates to apparatus for containing catalysts, particularly catalysts used in ammonia oxidation vessels, and processes using such apparatus.

BACKGROUND OF THE INVENTION

Ammonia oxidation is carried out industrially with air to generate nitric oxide, which used to make nitric acid (the Ostwald Process) or with air and methane to generate hydrogen cyanide (the Andrussow Process). In both processes, the reactant gases are mixed and passed at elevated temperature and pressure through a reaction vessel in which is placed a pack of platinum/rhodium gauzes that catalyse the oxidation reactions. The gauzes are typically circular and are supported on a frame or basket that holds them perpendicular to the flow of gases through the reactor. The catalyst pack may also comprise one or more palladium-rich gauzes, known as "catchment gauzes" that act to capture volatilised platinum.

In recent years there has been a desire to thrift the amount of platinum used in the catalyst packs and catalyst arrangements combining both precious metal gauzes and particulate metal oxide catalysts have been tested. WO 99/64352 describes a process wherein a mixture of ammonia and air at an elevated temperature is fed to a catalyst comprising one or more gauzes of at least one precious metal in elemental filamentary form, and the resultant gas mixture passed through a layer of a particulate oxidic cobalt-containing catalyst placed below the gauzes.

In addition, the evolution of nitrous oxide ($N_2O$) from ammonia oxidation processes using has come under scrutiny as a potent greenhouse gas, and nitrous oxide abatement catalysts have also been included in the ammonia oxidation vessels as layers underneath the precious metal ammonia oxidation catalyst. For example, it has been proposed in WO 99/07638 to oxidise ammonia by combusting ammonia with air in the presence of a platinum gauze catalyst and passing the resultant gasses through a layer of nitrous oxide decomposition catalyst comprising a ceramic doped with specific metals or metal oxides disposed below the gauzes and above heat recovery means in the ammonia oxidation reactor. Similarly, WO 00/13789 describes a similar process whereby a metal oxide selected from those of La, Cr, Mn, Fe, Co, Ni and Cu was used as a nitrous oxide decomposition catalyst immediately after a platinum gauze in an ammonia oxidation reactor.

In each of these cases the problem exists that by placing a particulate catalyst in a layer below the precious metal gauzes an increase in the resistance to flow of the gases takes place. This increases the pressure drop through the reaction vessel thereby increasing compression costs. Furthermore in processes operated at high pressure, e.g. above 7 barg, the contact time between the reactants and the particulate catalyst may not be sufficient in the thin beds used in an attempt to alleviate the pressure drop problem. Therefore there is a need to provide a catalyst arrangement that overcomes these problems.

SUMMARY OF THE INVENTION

Accordingly the invention provides a catalyst containment unit, suitable for use in an ammonia oxidation vessel, comprising two concentric perforate members defining an annular spate in which a particulate catalyst may be placed, and process fluid-impermeable end members mounted on the ends of the perforate members, wherein one end member extends across the unit to provide a closed end and the other end member closes the annular space thereby providing an open end through which gases may enter or exit the unit, and suspending means attached to one or both end members by which the unit may be secured within a reactor.

The catalyst containment unit therefore provides a means for passing gases radially through the particulate catalyst. Radial flow reactors are known, however, to our knowledge none comprise a catalyst containment unit wherein an end member serves as suspending means by which the unit is secured within a reactor. Moreover, to our knowledge, radial flow catalyst bed structures have not heretofore been used in ammonia oxidation vessels. The radial flow arrangement allows for a reduced pressure drop for the same particulate catalyst volume or an increase in the amount of catalyst for the same pressure drop, thus offering the operator increased operational flexibility and reduced compression costs.

The perforate members are suitably cylindrical meshes of sufficient structure and strength to contain the catalyst, or plates having a plurality of orifices. Cylindrical steel meshes may be used. By the term "steel" we mean suitable high-temperature stable alloys, including non-Fe-based alloys such as Ni-based materials. In a preferred embodiment, one or both perforate members comprise one or more platinum catalyst gauzes, and/or one or more palladium catchment gauzes. This has the advantage that the precious metal gauzes used to prepare the perforate members may be rectangular, and therefore produce less waste in fabrication than circular precious metal gauzes of the same surface area. Multiple catalyst and or catchment and or steel gauzes may be used, which may be the same or different. The end members are suitably fabricated from steel sheet and preferably are detachably mounted to the perforate members to allow catalyst loading & unloading. Where the perforate members are cylindrical, the closed end member may be circular with a diameter at least that of the outer perforate member, and the open end member may be ring shaped with a central hole of diameter at most equal to that of the inner perforate member. The suspending means may be attached to one or both end members. Preferably the suspending means are provided by extending the end member forming the open end of the unit. When the unit is placed in a reactor, the end members may also be inclined to direct the flow of gases through the containment unit in the desired manner. Additionally, baffles may also be provided on the unit to direct the flow of gases radially through the catalyst. For example a conical baffle may be placed on the closed end member.

The flow of gases through the containment unit may be radially inwards, i.e. from the periphery of the unit towards its centre, or may be radially outwards, i.e. from the central region outwards to wards the periphery. For simplicity of design, outward radial flow is preferred. In this case a baffle is desirable that acts as a heat shield and prevents the hot gases exiting the unit from contacting directly with the inside wall of the ammonia oxidation vessel.

The flow through the vessel may be upflow or downflow.

The particulate catalyst is preferably an ammonia oxidation catalyst, a nitrous oxide abatement catalyst or a mixture or layered combination thereof. It will be understood that additional perforate members may be used to separate layers of particulate catalyst within the containment unit if desired.

The particulate catalyst is preferably in the form of shaped units such as pellets, spheres, rings, cylinders, multi-holed extrudates and the like, which may be lobed or fluted, that have maximum and minimum dimensions in the range 1.5 to 20 mm, particularly 3 to 10 mm. The aspect ratio of the shaped units, i.e. the ratio of the maximum to minimum dimensions, is preferably less than 2.

In one embodiment, the particulate catalyst is an ammonia oxidation catalyst. The ammonia oxidation catalyst may be a platinum group metal catalyst, which may be supported, such as a Rh- and/or Ir-based catalyst, or may be or comprise a base metal or base metal oxide, especially where the base metal is a transition metal or a rare earth metal, and may, for example, comprise one or more of iron, nickel, copper, cobalt, manganese, silver, or supported platinum, palladium or ruthenium. The catalyst may also be a mixture of one or more base metals with one or more precious metals. Hence, ammonia oxidation catalysts suitable for use in the present invention include cobalt-containing and non-cobalt-containing ammonia oxidation catalysts and mixtures of these. Included within these are Au, supported PGM catalysts, $La_2O_3$, $CO_3O_4$ optionally with minor quantities of $Li_2O$, certain spinels such as $CoAl_2O_4$, certain substituted $ABO_3$ materials, certain perovskites such as $LaCoO_3$, including $LaCoO_3$ in which partial substitution (e.g. up to 20 mole %) of the A-site has been made by e.g. Sr or Ce, or partial substitution (e.g. up to 50 mole %) of the B-site has been made by e.g. Cu), $La_2CoO_4$, $CO_3O_4$ supported on alumina, thoria, ceria, zinc oxide or calcium oxide, $CO_3O_4$ or $Bi_2O_3$ promoted by rare earth elements or thorium and optionally containing one or more of oxides of Mn, Fe, Mg, Cr or Nb, $CoO_x$ with Pt on a support.

In a preferred embodiment the catalyst containment unit is used to contain a particulate nitrous oxide abatement catalyst. The nitrous oxide decomposition catalyst may be a supported metal, a pure or mixed metal oxide or a zeolitic system (for example those described on pages 30-32 of Kapteijn et al, *Applied Catalysis B; Environmental*, 9 (1996) pages 25-64 and the references provided therein). Supported metal nitrous oxide abatement catalysts that may be used in the present invention include one or more of rhodium, ruthenium, palladium, chromium, cobalt, nickel, iron and copper on shaped units of oxides of alkaline earth metals e.g. magnesium (Mg) or calcium (Ca), alumina, silica, titania or zirconia. The metal loading in the supported metal nitrous oxide decomposition catalysts will depend upon the activity of the metal and the nature of the support used. The metal loading may be 1% by weight or less but may be greater than 20% by weight. The supported metal catalyst may form oxide phases on the support under the reaction conditions. Hence, suitable nitrous oxide decomposition catalysts include oxides of rhodium (Rh), iridium (Ir), cobalt (Co), iron (Fe), nickel (Ni), copper Cu(II), lanthanum (La), calcium (Ca), strontium (Sr), vanadium V(III), hafnium (Hf), manganese Mn(III), cerium (Ce), thorium (Th), tin (Sn), chromium (Cr), magnesium (Mg), zinc (Zn) and cadmium (Cd), preferably Rh, Ir, Co, Fe and Ni. Supported metal oxides that may be used in the present invention include any of the above pure oxides, particularly oxides of Fe, Cr(III), Mn(III), Rh, Cu and Co supported on oxides of alkaline earth metals e.g. magnesium or calcium, alumina, silica titania, zirconia or ceria. Preferably the supported oxide comprises between 0.5 and 50% by weight of the pure metal oxide catalyst.

Mixed metal oxides effective as nitrous oxide decomposition catalysts include doped-oxides or solid solutions, spinels, pyrochlores and perovskites. Other useful mixed oxide catalysts that may be used in the process of the present invention include transition metal-modified hydrotalcite structures containing Co, Ni, Cu, La, Mg, Pd, Rh and Ru and solid solutions comprising Co(II) oxide and Mn(III) oxide in magnesia or alumina.

However preferred mixed oxide nitrous oxide decomposition catalysts are spinels and perovskites. Spinel catalysts that may be used in the present invention may be of formula $M^1M^2O_4$ wherein $M^1$ is selected from Co, Cu, Ni, Mg, Zn and Ca, $M^2$ is selected from Al, Cr, or Co (and thus also includes $CO_3O_4$), $Cu_xCO_{3-x}O_4$ (where x=0-1), $CO_xMg_{1-x'}Al_2O_4$ (where x'=0-1), $CO_{3-x''}Fe_{x''}O_4$ or $CO_{3-x''}Al_{x''}O_4$ (where x''=0-2). A preferred nitrous oxide abatement catalyst is described in WO 02/02230. The catalyst comprises 0.1-10 mol % $CO_{3-x}M_xO_4$, where M is Fe or Al and x=0-2, on a cerium oxide support. The catalyst may also contain 0.01-2 weight % $ZrO_2$. A suitable non-Co containing spinel catalyst is $CuAl_2O_4$.

Perovskite nitrous oxide decomposition catalysts may be represented by the general formula $ABO_3$ wherein A may be selected from La, Nd, Sm and Pr, B may be selected from Co, Ni, Cr, Mn, Cu, Fe and Y. Partial substitution of the A-site (e.g. up to 20 mol %) may be performed with divalent or tetravalent cations e.g. $Sr^{2+}$ or $Ce^{4+}$ to provide further useful nitrous oxide decomposition catalysts. In addition, if desired, partial substitution of one B-site element (e.g. up to 50 mol %) with another may be performed to provide further useful nitrous oxide decomposition catalysts. Suitable perovskite catalysts include $LaCoO_3$, $La_{1-x}Sr_xCoO_3$, $La_{1-x}Ce_xCoO_3$ (where $x \leq 0.2$) and $LaCu_yCO_{1-y}O_3$ (where $y \leq 0.5$). Preferred nitrous oxide decomposition catalysts are supported Rh catalysts and supported or unsupported pure and mixed metal oxides of one or more of Co, Mn, Fe, Cu, Cr and Ni, preferably Co in a spinel or perovskite structure.

In a preferred embodiment, the nitrous oxide decomposition catalyst is also an effective ammonia oxidation catalyst. Accordingly, we have realised that in order to accommodate the guard material within the catalyst assembly, use of a catalyst that acts both as an ammonia oxidation catalyst and as a nitrous oxide decomposition catalyst offers practical advantages in catalyst assembly design and construction. Hence a particularly preferred nitrous oxide decomposition catalyst is a particulate composition containing oxides of cobalt and other metals, particularly rare earths, for example as described in EP-B-0946290. These cobalt-containing catalysts have the further advantage in that they are highly active ammonia oxidation catalysts in their own right. The preferred catalyst comprises oxides of (a) at least one element Vv selected from cerium and praseodymium and at least one element Vn selected from non-variable valency rare earths and yttrium, and (b) cobalt, said cobalt and elements Vv and Vn being in such proportions that the (element Vv plus element Vn) to cobalt atomic ratio is in the range 0.8 to 1.2, at least some of said oxides being present as a mixed oxide phase with less than 30% of the cobalt (by atoms) being present as free cobalt oxides. Preferably less than 25% (by atoms) of the cobalt is present as free cobalt oxides, and in particular it is preferred that less than 15% (by atoms) of the cobalt is present as the cobalt monoxide, CoO. The proportion of the various phases may be determined by X-ray diffraction (XRD) or by thermogravimetric analysis (TGA) making use, in the latter case, of the weight loss associated with the characteristic thermal decomposition of $CO_3O_4$ which occurs at approximately 930° C. in air. Preferably less than 10%, particularly less than 5%, by weight of the composition is free cobalto-cobaltic oxide and less than 2% by weight is free cobalt monoxide.

Thus there may be a Perovskite phase, e.g. $VnCoO_3$ or $VvCoO_3$, mixed with other phases such as $Vv_2O_3$, $Vn_2O_3$, $(Vv_xVn_{1-x})_2O_3$ or $Vv_xVn_{1-x}O_2$. A particularly preferred catalyst is a $La_{1-x}Ce_xCoO_3$ material. Such catalysts may be prepared according to examples 2 and 3 of EP-B-0946290 herein incorporated by reference.

Whereas the containment unit may be placed in a reaction vessel as a stand alone unit, it is preferred that the unit is used in combination with a precious metal ammonia oxidation catalyst. Accordingly, the invention further provides a catalyst combination comprising a precious metal ammonia oxidation catalyst gauze on a supporting framework and a particulate catalyst disposed in the catalyst containment unit.

Precious metal gauzes may be formed by weaving or knitting or otherwise forming precious metal filaments into a gauze-like structure. Such catalyst gauzes are well established and may consist of platinum or platinum alloy filaments of thickness from 0.02 to 0.15 mm woven to provide rectangular interstices, knitted to provide a regular looped structure or simply agglomerated to provide a non-woven irregular structure. Herein the term 'filament' is meant to include wires that have a substantially circular cross-section and also wires that are flattened or otherwise shaped and thereby have a non-circular cross section. Woven gauzes are well established and typically comprise 0.076 mm diameter wire, woven to provide 1024 apertures per square centimetre and prepared to a specific weight per unit area dependant upon the wire composition. Knitted gauzes offer a number of advantages in terms of catalyst physical properties, catalyst activity and lifetime. Knitted gauzes comprise a regular looped structure and may be formed using wire with diameters in the same range as woven materials, in a variety of shapes and thicknesses using variety of stitches such as tricot, jacquard, satin stitch (smooth sunk loops) and raschel. EP-B-0364153, page 3, line 5 to line 56 describes knitted gauzes of particular use in the present invention. Non-woven gauzes are described for example in GB 2064975 and GB 2096484.

The precious metal ammonia oxidation catalyst is preferably platinum (Pt) or a platinum alloy, such as an alloy of platinum with rhodium (Rh) and/or palladium (Pd) containing $\geq 85\%$ preferably $\geq 90\%$ Pt by weight. Alloys used in ammonia oxidation in the production of nitric acid or hydrogen cyanide include 10% Rh 90% Pt, 8% Rh 92% Pt, 5% Pd 5% Rh 90% Pt and 5% Rh 95% Pt. Alloys containing upto about 5% of iridium (Ir) may also be used in the present invention. The precious metal catalyst may desirably be formulated to reduce nitrous oxide by-product formation, and may thus have an increased rhodium (Rh) content, or may contain other components such as cobalt (Co).

BRIEF DESCRIPTION OF THE FIGURES

The invention is further illustrated by reference to the drawings in which.

DETAILED DESCRIPTION OF THE INVENTION

In a conventional nitric acid plant, the number of gauzes employed depends on the pressure at which the process is operated. For example in a plant operating at low pressure, e.g. up to about 5 bar abs., typically <10, often 3 to 6 gauzes may be employed, while at higher pressures, e.g. up to 20 bar abs., a greater number of gauzes, typically >20, often 35-45, may be employed. The gauzes, which are normally circular, may be incorporated individually into the reactor or may be pre-formed into a pad comprising a number of gauzes that may be welded at their periphery. The pad may comprise a combination of woven and knitted or possibly non-woven gauzes whose elemental composition may be the same or different. If adjacent woven gauzes are present, to facilitate replacement, they are preferably arranged so that their warps or wefts are at an angle of 45° to each other. Angular displacement, suitably at 90°, may also be used between adjacent woven gauzes to reduce opportunities for gas channeling.

Catchment gauzes based on palladium are desirably used in ammonia oxidation plants to act as so-called "getters" or collectors of 'vaporised' platinum lost by chemical action, evaporation or mechanical losses from the precious metal catalyst. Such catchment gauzes may be in the form of woven or knitted gauzes or agglomerated non-woven gauzes akin to those described above for the precious metal catalysts. Any palladium present in a gauze will be able to catch vapourised platinum passing over it, hence the palladium content of the catchment gauze may be from 10 to 95% wt, preferably >40%, more preferably >70%. One or more palladium based catchment gauzes may be used. The catchment gauzes may be provided underneath the precious metal catalyst gauzes individually or form a lower or final gauze as part of a precious metal catalyst pad. The catchment gauzes may be knitted, e.g. according to the aforesaid EP-B-0364153 and may form a layer or layers in a precious metal catalyst knitted structure, e.g. a layer in a knitted pad. Alternatively the palladium-based guard material is woven or knitted into a precious metal ammonia oxidation catalyst gauze by using it as a filament in the weaving or knitting process. Palladium-based guard materials suitable for weaving or knitting into gauze structures are palladium or palladium alloys with nickel (Ni), cobalt (Co) or gold (Au). For example a catchment gauze may be fabricated from a 95:5% wt Pd:Ni alloy. In addition the palladium-based guard material may desirably be formulated to reduce nitrous oxide by-product formation, and may thus preferably contain a small amount, e.g. <5% rhodium (Rh). In particular, palladium gauzes containing amounts of platinum and rhodium may be used. Such gauzes may comprise, for example >92% wt palladium, 2-4% wt rhodium and the remainder platinum, or alternatively comprise 82-83% wt palladium, 2.5-3.5% wt rhodium and the remainder platinum. Ceramic fibres comprising an inert refractory material, such as alumina, zirconia or the like, may also be woven or knitted into catchment gauzes in addition to the palladium-based materials.

The supporting framework for the gauzes may be any currently in use and includes simple girder support arrangements that extend across the vessel and so-called "baskets" in which the precious metal gauzes are supported on the base of a cylindrical unit suspended within the ammonia oxidation vessel.

The containment unit may be separate from the supporting framework for the precious metal gauzes, but in a preferred embodiment, the containment unit is fixed to the precious metal supporting framework using the suspending means. In a particularly preferred arrangement, the catalyst containment unit is suspended from a precious metal catalyst basket.

The catalyst containment unit may be installed in any ammonia oxidation vessel having a suitable space to accommodate it. Alternatively, the vessel may be adapted to make a suitable space available. Ammonia oxidation vessels vary in size but are typically domed cylindrical vessels with internal diameters in the range 0.5-6 metres. The catalyst containment unit of the present invention may be fabricated to fit within these reactors. For example, in a 1.5 m diameter vessel, the annular space provided by the unit may be 180 mm in width by 700-750 mm in height. The catalyst volume provided in this way would give too high a pressure drop were it provided conventionally as a layer under the precious metal gauze pack.

The catalyst containment unit may be placed below the precious metal gauzes so that the gases enter the ammonia oxidation vessel through an inlet in the top, then pass vertically (i.e. axially) downwards through the precious metal catalyst layer, enter the open end of the containment unit then pass radially through the particulate catalyst disposed in the containment unit and then out of the base of the unit and exit the ammonia oxidation vessel via an outlet in the base. The arrangement may be reversed in an upflow vessel.

In cases where a combination of precious metal gauze and particulate catalyst is used, the invention further provides a method of retrofitting an ammonia oxidation vessel comprising suspending a catalyst containment unit beneath the precious metal catalyst The invention further provides an ammonia oxidation process comprising the step of passing a gas mixture comprising ammonia, an oxygen containing gas such as air and optionally a methane containing gas through a particulate catalyst disposed in the catalyst containment unit.

Preferably the process comprises passing a gas mixture comprising ammonia, an oxygen containing gas such as air and optionally a methane containing gas through a precious metal catalyst gauze on a supporting framework and a particulate catalyst disposed in the catalyst containment unit.

In the oxidation of ammonia to nitric oxide for the manufacture of nitric acid, the oxidation process may be operated at temperatures of 750-1000° C., particularly 850-950° C., pressures of 1 (low pressure) to 15 (high pressure) bar abs., with ammonia in air concentrations of 7-13%, often about 10%, by volume. In the oxidation of ammonia with air in the presence of methane for the manufacture of hydrogen cyanide, the Andrussow Process, the operating conditions are similar. The present invention is particularly suited to processes and ammonia oxidation reactors operated at pressures in the range 6-15 bar abs, particularly 7-15 bar g (so-called high pressure plants) because the containment unit may readily be placed in the vessel without having to move or adjust heat recovery means commonly found just below the gauzes n medium pressure and atmospheric plants.

Under operating conditions described heretofore it has been usual practice to fully oxidise the ammonia passing through precious metal catalyst gauzes and then if desired pass the resultant nitrogen oxides over a bed of nitrous oxide decomposition catalyst. Apart from the reduction in process efficiency, to operate otherwise could expose the operator to the highly undesirable risk of passing ammonia (i.e. "ammonia slip") to the nitric oxide absorber where explosive ammonium nitrate may form. By incorporating a nitrous oxide decomposition catalyst that is also an effective ammonia oxidation catalyst into the catalyst assembly, it is possible to permit a controlled portion of the ammonia fed to the precious metal catalyst to pass through it. This may enable a reduction in the amount of precious metal catalyst required or possibly enable a higher ammonia flowrate to be used. In addition, conventional precious metal gauze catalysts, as have been referred to earlier, lose platinum in use, and eventually this is sufficient to cause a loss of conversion and an increased risk of ammonia slip. The present invention, under preferred conditions, may allow increased catalyst life or "campaign length" before shutdown to replace precious metal catalyst, because the preferred nitrous oxide decomposition catalyst is effective to catalyse the oxidation of ammonia. Such increased campaign lengths are of great significance to plant operators and are highly desirable.

The process of the present invention may provide aggregate $N_2O$ levels below 1600 ppm, preferably below 600 ppm, more preferably below 500 ppm and most preferably below 200 ppm when a particulate nitrous oxide abatement catalyst is provided in the catalyst containment unit. Furthermore using the catalyst assemblies of the present invention the campaign length of ammonia oxidation processes may be increased, e.g. by $\geq 10\%$, preferably $\geq 20\%$.

Hence for a low-pressure ammonia oxidation process, the catalyst assembly of the present invention may comprise 1 or 2 precious metal ammonia oxidation catalyst gauzes followed by one or more gauzes of palladium catchment, followed by a radial flow bed of shaped units of an oxidic cobalt-containing nitrous oxide decomposition catalyst. Likewise in a high-pressure plant, there may be less than 15, e.g. 10, precious metal ammonia oxidation catalyst gauzes followed by the catchment and the bed of the oxidic cobalt-containing nitrous oxide decomposition catalyst. Thus, for example, the catalyst assembly may comprise 10 or fewer gauzes of a platinum or platinum-alloy ammonia oxidation catalyst, one or more gauzes of palladium catchment, a radial-flow bed of shaped units of a mixed metal rare-earth cobalt perovskite catalyst. In a preferred embodiment, the catalyst assembly comprises 10 or fewer platinum or platinum alloy ammonia oxidation catalyst gauzes followed by one or more gauzes of palladium catchment comprising <5% wt Rh, followed by a radial flow bed of shaped units of mixed metal rare-earth cobalt perovskite catalyst, preferably as described in EP-B-0946290.

Figure 1:
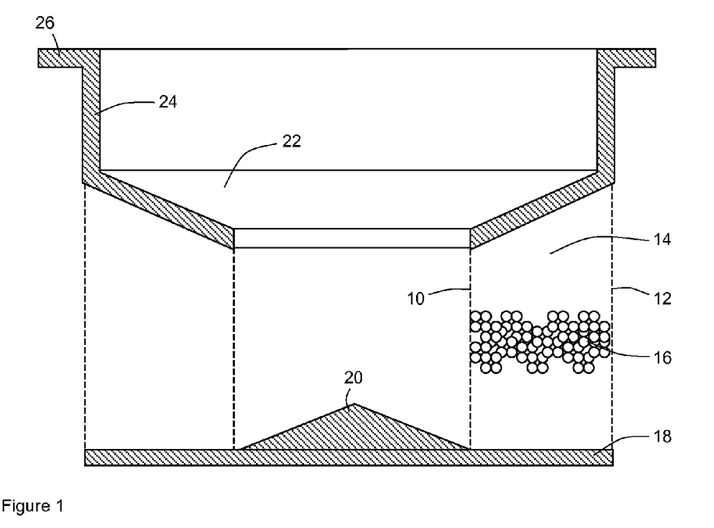
FIG. 1 is a cut-away side elevation of a catalyst containment unit according to a first embodiment with the end members arranged to provide outwards radial flow.

In FIG. 1 the catalyst containment unit comprises inner and outer concentric cylindrical meshes 10, 12 formed from steel mesh and/or one or more platinum oxidation catalyst gauzes and/or one or more palladium catchment gauzes, defining a space 14 in which may be placed a particulate ammonia oxidation and/or nitrous oxide abatement catalyst 16. The meshes 10, 12 are mounted on a circular steel sheet 18 that extends horizontally across the width of the unit, thereby forming a closed end. On the upper surface of sheet 18 and within the inner cylindrical mesh 10 is placed a conical baffle 20 that acts to direct gas radially through the unit. The annular space 14 is closed at the other end of the meshes 10, 12 by a ring-shaped steel end member 22 having a central hole corresponding to the diameter of the inner mesh, thereby forming an open end. The end member 22 is angled from the outer mesh downwards towards the inner mesh at an angle of about 45 degrees. Suspending arm 24 is formed by vertically extending the edge of the ring member 22 from the outer mesh 12. The suspending arm 24 has a flange 26 at its extremity to permit installation of the unit into a reactor. Threaded steel rods (not shown) connect the end members 18, 22, and allow the unit to be disassembled for catalyst loading and unloading.

In use, gases enter the unit via the central hole in the ring-shaped end member 22, pass through mesh 10, catalyst 16, and mesh 12, and then out of the unit.

Figure 2:
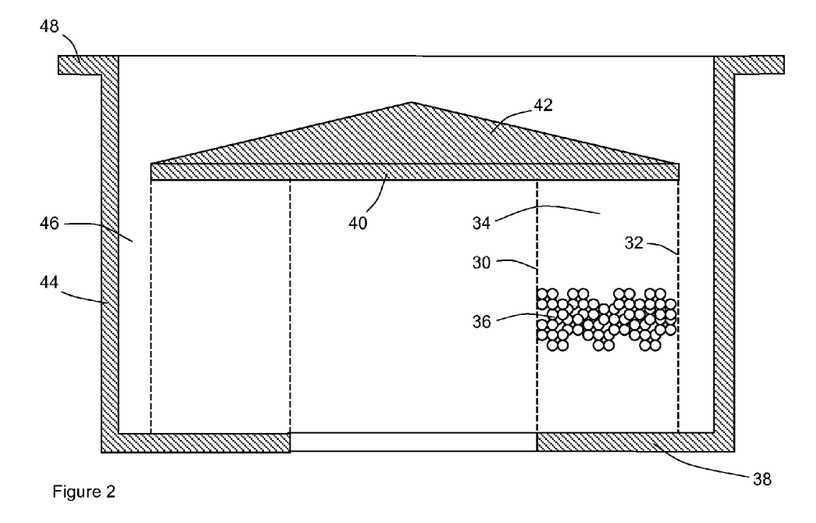
FIG. 2 is a cut-away side elevation of a catalyst containment unit according to a second embodiment with the end members arranged to provide inwards radial flow.

In FIG. 2, the catalyst containment unit comprises inner and outer concentric cylindrical meshes 30, 32 formed from steel mesh and/or one or more platinum oxidation catalyst gauzes and/or one or more palladium catchment gauzes, defining a space 34 in which may be placed a particulate ammonia oxidation and/or nitrous oxide abatement catalyst 36. The meshes 30, 32 are mounted on a ring-shaped steel end member 38, having a central hole corresponding to the diameter of the inner mesh, thereby forming an open end. At the other end of the meshes 30,32, the unit has a circular steel sheet end member 40 mounted horizontally on the meshes and extending across the width of unit thereby providing a closed end. On the upper surface of sheet 40 and extending across its width is a conical baffle 42. Suspending arm 44 is formed by extending the sides of the ring end member 38 horizontally then vertically from the outer mesh 32 to above the end member 40. Providing the suspending means in this manner provides a peripheral annular void 46 around the outer mesh 32 through which gases may flow to the unit. The suspending arm 44 has a flange 48 at its extremity to permit installation of the unit into a reactor. Threaded steel rods (not shown) connect the end members 38, 40, and allow the unit to be disassembled for catalyst loading and unloading.

In use, gases enter the unit via the annular void 46, pass through mesh 32, catalyst 36, and mesh 30, and then out of the unit via the central hole in ring end member 38.

Figure 3:
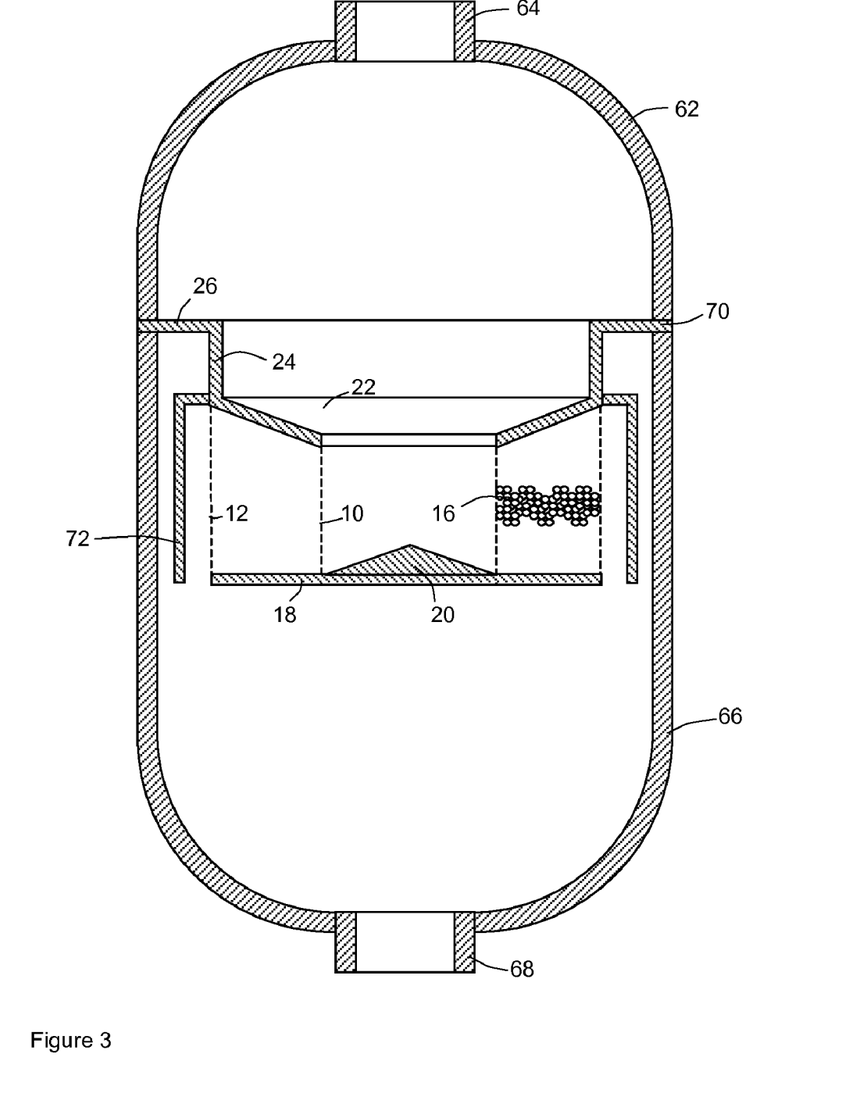
FIG. 3 is a cut-away side elevation of an ammonia oxidation vessel containing a catalyst containment unit with the end members arranged to provide outwards radial flow.

In FIG. 3, a cylindrical ammonia oxidation vessel comprises a domed upper portion 62 with inlet 64 and a domed lower portion 66 with outlet 68. A flanged joint 70 joins the upper and lower portions. Suspended from this joint 70 within the vessel is a catalyst containment unit as depicted in FIG. 1 in which mesh 10 comprises a plurality of platinum ammonia oxidation catalyst gauzes. The catalyst-side of the mesh 10 may also comprise one or more palladium catchment gauzes and the mesh may further comprise one or more strengthening steel meshes. Mesh 12 is preferably a steel mesh. In order to reduce stresses on the interior walls of the lower portion 66, a shroud baffle or heat shield 72 is provided around the periphery of the catalyst containment unit between the outer mesh 12 and the inside wall of the vessel 66. The shroud baffle 72 is conveniently suspended from the suspending means 24 and spaced from the outer mesh so that gases emerging from the unit may readily pass to the lower portion of the vessel.

In use, a mixture of ammonia and air, optionally containing methane, is passed at elevated temperature and pressure downwards through the inlet 64 and is deflected by member 22 to pass through the open end of the catalyst containment unit. The gases then pass radially, with the assistance of baffle 20, through catalyst mesh 10, particulate catalyst 16 and steel mesh 12. The catalyst mesh catalyses the oxidation of the ammonia and the particulate catalyst may complete the ammonia oxidation reaction and/or catalyse the decomposition of nitrous oxide formed in the initial oxidation step. The reacted gases then exit the unit and are deflected downwards by shroud 72 to the lower portion 66 of the vessel and then out of the vessel via outlet 68.

Figure 4:
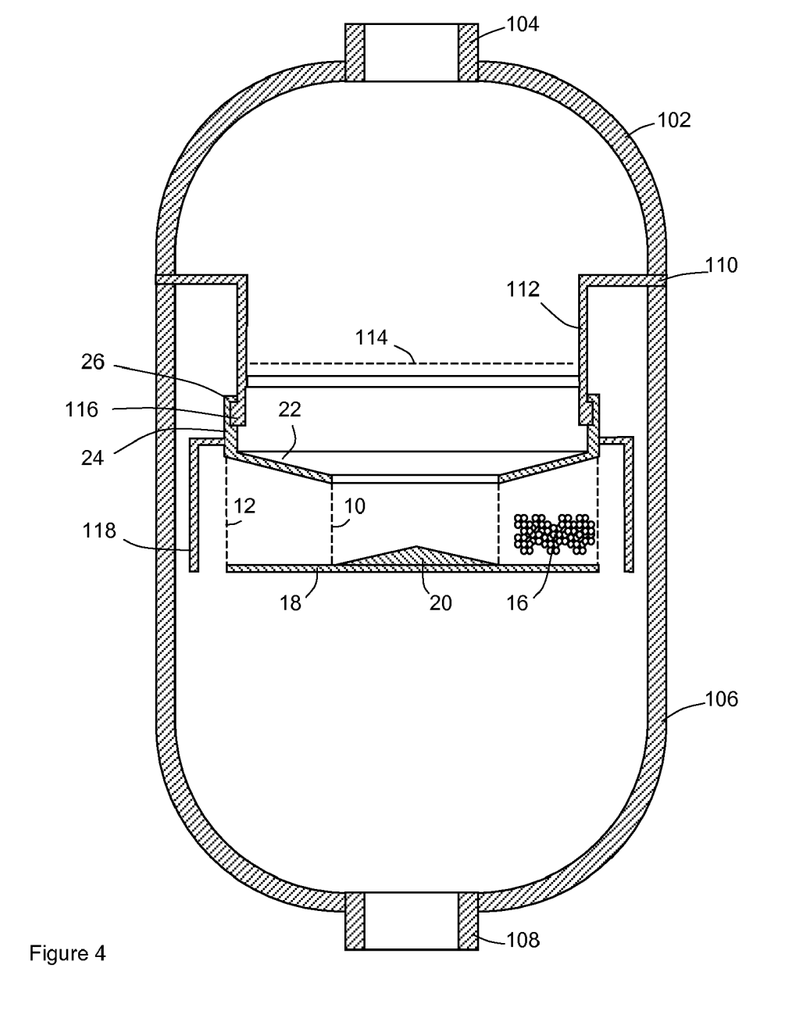
FIG. 4 is a cut-away side elevation of an ammonia oxidation vessel containing a catalyst combination comprising a precious metal gauze supported in a basket and a catalyst containment unit suspended from said basket with the end members arranged to provide outwards radial flow.

In FIG. 4, a cylindrical ammonia oxidation vessel comprises a domed upper portion 102 with inlet 104 and a domed lower portion 106 with outlet 108. A flanged joint 110 joins the upper and lower portions. Suspended from this joint 110 within the vessel is a gauze-support 112 in the form of a steel-frame basket containing a precious metal gauze pack 114 made up of a plurality of platinum/rhodium ammonia oxidation gauzes and a smaller number of palladium-based catchment gauzes. Suspended from basket 112 is a catalyst containment unit as depicted in FIG. 1, in which the meshes 10, 12 are steel meshes and the flange 26 on the suspending means 24 is attached to limbs 116 extending from the underside of basket 112. In order to reduce stresses on the interior walls of the lower portion 106, a shroud baffle or heat shield 118 is provided around the periphery of the catalyst containment unit between the outer mesh 12 and the inside wall of the vessel 106. The shroud baffle is fixed to suspending means 24 and is spaced from the outer mesh so that gases emerging from the unit may readily pass to the lower portion of the vessel.

In use, a mixture of ammonia and air, optionally containing methane, is passed at elevated temperature and pressure through the inlet 104 and distributed over the surface of the catalyst gauze pack 114 by means of distribution means (not shown). The gases pass downwards (axially) through the gauze pack where the ammonia oxidation reactions take place. The hot gas mixture then passes downwards and is deflected by member 22 to pass through the open end of the catalyst containment unit. The gases then pass radially, with the assistance of baffle 20, through mesh 10, catalyst 16 and mesh 12 where the desired reactions take place. The desired reaction may be the completion of the ammonia oxidation reaction by oxidation of ammonia that has remained unreacted after passage through pack 114, and/or the decomposition of nitrous oxide formed in the initial oxidation step. The reacted gases then exit the unit and are deflected downwards by shroud 118 to the lower portion 106 of the vessel and then out of the vessel via outlet 108.

The invention claimed is:

1. A catalyst combination comprising a precious metal ammonia oxidation catalyst gauze on a supporting framework and a particulate catalyst disposed in a catalyst containment unit comprising two concentric perforate members defining an annular space in which a particulate catalyst may be placed, and process fluid-impermeable end members mounted on the ends of the perforate members, wherein one end member extends across the unit to provide a closed end and the other end member closes the annular space thereby providing an open end through which gases may enter or exit the unit, and suspending means attached to one or both end members.

2. The catalyst combination according to claim 1 wherein the precious metal ammonia oxidation catalyst gauze consists of platinum (Pt) or a platinum alloy.

3. The catalyst combination according to claim 1 wherein a palladium catchment gauze is provided underneath the precious metal ammonia oxidation catalyst gauze.

4. The catalyst combination according to claim 1 wherein the supporting framework for the precious metal ammonia oxidation gauzes comprises a girder support arrangement or is a basket in which the precious metal ammonia oxidation gauzes is supported on the base of a cylindrical unit.

5. The catalyst combination according to claim 1 wherein the containment unit is separate from the supporting framework for the precious metal ammonia oxidation gauzes, or is fixed to the precious metal ammonia oxidation gauze supporting framework by the suspending means.

6. The catalyst combination according to claim 1 wherein the precious metal ammonia oxidation catalyst gauze consists of an alloy of platinum with rhodium (Rh) or palladium (Pd) containing $\geq 85\%$ Pt by weight, or mixtures thereof.

7. The catalyst combination according to claim 1 wherein the precious metal ammonia oxidation catalyst gauze consists of an alloy of platinum with rhodium (Rh) or palladium (Pd) containing $\geq$90% Pt by weight, or mixtures thereof.

8. The catalyst combination according to claim 1 wherein the perforate members are cylindrical steel meshes.

9. The catalyst combination according to claim 1 wherein, one or both perforate members comprise one or more platinum catalyst gauzes and/or one or more palladium catchment gauzes.

10. The catalyst combination according to claim 1 wherein the two perforate members are cylindrical and comprise an inner perforate member and an outer perforate member, the closed end member is circular with a diameter at least that of the outer perforate member, and the open end member is ring shaped with a central hole of diameter at most equal to that of the inner perforate member.

11. The catalyst combination according to claim 1 wherein the end members are detachably mounted to the perforate members to allow catalyst loading and unloading.

12. The catalyst combination according to claim 1 wherein the suspending means are provided by extending the end member forming the open end of the unit.

13. The catalyst combination according to claim 1 wherein baffles are provided on the unit to direct a flow of gases radially through the catalyst.

14. The catalyst combination according to claim 1 wherein the particulate catalyst comprises a particulate ammonia oxidation catalyst, a particulate nitrous oxide abatement catalyst or a mixture or layered combination thereof.

15. The catalyst combination according to claim 14 wherein the particulate catalyst is a particulate nitrous oxide abatement catalyst, wherein the particulate nitrous oxide abatement catalyst is selected from the group consisting of a supported Rh catalyst, and a supported or unsupported pure and mixed metal oxide of one or more of Co, Mn, Fe, Cu, Cr and Ni.

16. The catalyst combination according to claim 14 wherein the particulate nitrous oxide abatement catalyst is in a spinel or perovskite structure.

17. An ammonia oxidation process comprising the step of passing a gas mixture comprising ammonia, an oxygen containing gas and optionally a methane containing gas through a catalyst combination comprising a precious metal ammonia oxidation catalyst gauze on a supporting framework and then through a particulate catalyst disposed in a catalyst containment unit comprising two concentric perforate members defining an annular space in which a particulate catalyst may be placed, and process fluid-impermeable end members mounted on the ends of the perforate members, wherein one end member extends across the unit to provide a closed end and the other end member closes the annular space thereby providing an open end through which gases may enter or exit the unit, and suspending means attached to one or both end members.

18. The ammonia oxidation process according to claim 17 operated at temperatures of 750-1000° C., pressures of 1 to 15 bar abs., with ammonia in air concentrations of 7-13% by volume.

19. The ammonia oxidation process according to claim 17 operated at pressures in the range 6-15 bar abs.

20. A method of retrofitting an ammonia oxidation vessel comprising suspending a catalyst containment unit beneath an existing precious metal catalyst gauze support frame, the catalyst containment unit comprising two concentric perforate members defining an annular space in which a particulate catalyst may be placed, and process fluid-impermeable end members mounted on the ends of the perforate members, wherein one end member extends across the unit to provide a closed end and the other end member closes the annular space thereby providing an open end through which gases may enter or exit the unit, and suspending means attached to one or both end members.

21. The method according to claim 20 comprising fixing the catalyst containment unit to an existing precious metal catalyst gauze support frame.

* * * * *